United States Patent
Ichikawa et al.

(10) Patent No.: US 7,966,354 B2
(45) Date of Patent: Jun. 21, 2011

(54) METHOD AND COMPUTER FOR SUPPORTING CONSTRUCTION OF BACKUP CONFIGURATION

(75) Inventors: Naoko Ichikawa, Yokohama (JP); Yuichi Taguchi, Sagamihara (JP); Masayuki Yamamoto, Sagamihara (JP); Takashi Watanabe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 707 days.

(21) Appl. No.: 12/020,799

(22) Filed: Jan. 28, 2008

(65) Prior Publication Data

US 2009/0077557 A1    Mar. 19, 2009

(30) Foreign Application Priority Data

Sep. 19, 2007    (JP) ................. 2007-241677

(51) Int. Cl.
G06F 12/16 (2006.01)
G06F 17/30 (2006.01)
(52) U.S. Cl. ...................... 707/823; 711/162
(58) Field of Classification Search .................. 707/648, 707/645, 653, 823
See application file for complete search history.

(56) References Cited

U.S. PATENT DOCUMENTS

| | | | | |
|---|---|---|---|---|
| 7,062,621 | B2 * | 6/2006 | Mizuno et al. | 711/162 |
| 7,085,904 | B2 * | 8/2006 | Mizuno et al. | 711/162 |
| 7,246,254 | B2 * | 7/2007 | Alur et al. | 714/2 |
| 7,650,356 | B2 * | 1/2010 | Raheem | 707/679 |
| 2003/0074600 | A1 * | 4/2003 | Tamatsu | 714/6 |
| 2003/0187847 | A1 * | 10/2003 | Lubbers et al. | 707/9 |
| 2005/0015641 | A1 * | 1/2005 | Alur et al. | 714/2 |
| 2005/0086445 | A1 * | 4/2005 | Mizuno et al. | 711/162 |
| 2007/0112883 | A1 | 5/2007 | Asano et al. | |

FOREIGN PATENT DOCUMENTS

JP    2007-140746    6/2007

* cited by examiner

Primary Examiner — James Trujillo
Assistant Examiner — Albert Phillips
(74) Attorney, Agent, or Firm — Antonelli, Terry, Stout & Kraus, LLP.

(57) ABSTRACT

For a storage system which holds backup data of a first data storage extent in one or more second data storage extents in use of a first backup method, a backup status in a first backup method in a prescribed period is acquired and a first backup performance in a first backup configuration is computed based on this backup status. Meanwhile, a second backup performance in a second backup configuration is estimated based on a prescribed assumption in a prescribed period. Information is outputted based on the computed first backup performance and the estimated second backup performance.

14 Claims, 13 Drawing Sheets

FIG. 2

REPLICATED DATA MANAGEMENT TABLE 135

| DATA STORAGE EXTENT IDENTIFIER | CAPACITY | GENERATION NO. | REPLICATED DATA STORAGE EXTENT IDENTIFIER | ACQUISITION TIME | CAPACITY |
|---|---|---|---|---|---|
| 00:01 | 100MB | 01 | 0A:01 | 2007/7/19/0:00 | 100MB |
| | | 02 | 0A:02 | 2007/7/18/0:00 | 100MB |
| | | 03 | 0A:03 | 2007/7/17/0:00 | 100MB |
| 1350 | 1351 | 1352 | 1353 | 1354 | 1355 |

FIG. 6

DETERMINATION CRITERIA MANAGEMENT TABLE 325

| DETERMINATION ITEM | CRITERIA VALUE | DETERMINATION CRITERIA | WEIGHTING COEFFICIENT |
|---|---|---|---|
| DATA PROTECTION PERIOD | 5 days | GREATER THAN CRITERIA VALUE | 0.4 |
| RECOVERY POINT CONTINUITY | 1 day | LESS THAN CRITERIA VALUE | 0.3 |
| BACKUP CAPACITY | 300 MB | LESS THAN CRITERIA VALUE | 0.2 |
| DATA PROTECTION PERIOD FLUCTUATION RANGE | 1 day | LESS THAN CRITERIA VALUE | 0.1 |
| 3250 | 3251 | 3252 | 3253 |

FIG. 9

MONITORING INFORMATION MANAGEMENT TABLE 326

| DATA STORAGE EXTENT IDENTIFIER | MONITORING PERIOD | DATA ACQUISITION INTERVAL |
|---|---|---|
| 00:01 | TWO DAYS | 15 MINUTES |
| 00:02 | ONE DAY | ONE MINUTE |
| 3260 | 3261 | 3262 |

FIG. 10

PERFORMANCE INFORMATION MANAGEMENT TABLE 327

| REPLICATED DATA STORAGE EXTENT IDENTIFIER | INPUT/OUTPUT PERFORMANCE |
|---|---|
| 0A:01 | 30MB/s |
| 0A:02 | 30MB/s |
| 0A:03 | 40MB/s |
| 3270 | 3271 |

FIG. 14

CDP MANAGEMENT TABLE 136

| TARGETED DATA STORAGE EXTENT IDENTIFIER | CAPACITY | BASE DATA STORAGE EXTENT IDENTIFIER | BASE DATA STORAGE EXTENT CAPACITY | BASE DATA TIME | JOURNAL STORAGE EXTENT IDENTIFIER | JOURNAL STORAGE EXTENT CAPACITY | JOURNAL CAPACITY THRESHOLD |
|---|---|---|---|---|---|---|---|
| 00:01 | 100MB | 0A:01 | 100MB | 2007/7/19/0:00 | 0B:01 | 100MB | 90MB |
| 00:02 | 100MB | 0A:02 | 100MB | 2007/7/19/9:00 | 0B:02 | 100MB | 90MB |
| 1360 | 1361 | 1362 | 1363 | 1364 | 1365 | 1366 | 1367 |

METHOD AND COMPUTER FOR SUPPORTING CONSTRUCTION OF BACKUP CONFIGURATION

CROSS-REFERENCE TO PRIOR APPLICATION

This application relates to and claims the benefit of priority from Japanese Patent Application number 2007-241677, filed on Sep. 19, 2007, the entire disclosure of which is incorporated herein by reference.

BACKGROUND

The present invention generally relates to technology for supporting the construction of a configuration related to a backup executed by a storage system.

Technology for backing up data (for convenience sake, referred to as "source data" hereinafter) in preparation for a failure or human error that results in the loss of source data is being widely applied in computer systems.

One known backup method involves creating a replicate (hereinafter, replicated data) at a certain time for backup-targeted source data, and storing this replicated data in a storage extent (for example, in a secondary logical volume that constitutes a pair with a primary logical volume, hereinafter referred to as "SVOL") that is different from the storage extent in which the source data is stored (for example, a primary logical volume, hereinafter referred to as "PVOL"). Replicated data is either created regularly on the basis of a preset schedule, or is created as deemed necessary in accordance with a user indication.

Further, another known backup method conforms to CDP (Continuous Data Protection) technology, which makes source data at an arbitrary point in time recoverable for a certain limited period of time. In this technology, information denoting a history related to the updating of source data (hereinafter, a journal) is acquired at source data updating, and this journal is stored in a storage extent that is different from the PVOL (for example, a logical volume, hereinafter referred to as "JVOL"). A replicate of the source data of prior to journal acquisition (hereinafter, "base data") is also created, and this is stored in a storage extent that is again different from the storage extent in which the source data and journal are stored (for example, a logical volume, hereinafter referred to as "BVOL"). When a data recovery request specifying an arbitrary specified time is received, one or more journals acquired from the BVOL creation time (base data acquisition time) up to this specified time are reflected in order in the BVOL, thereby recovering the source data of the specified time inside the BVOL (That is, the base data is updated to the source data of the specified time.).

To construct a backup configuration in a storage system for carrying out a backup using a backup method, which conforms to CDP technology (hereinafter, a CDP configuration), it is necessary to design beforehand a data protection period (a period from a prescribed time to the oldest time at which data is recoverable) and a JVOL storage capacity. Japanese Patent Laid-open No. 2007-140746 discloses technology for computing the required JVOL storage capacity based on user design conditions (target recovery point, target recovery time, journal storage period, and so forth) and measured data regarding the write status of the data.

However, in a storage system that is already in operation, it is assumed that some sort of backup method already exists prior to constructing a new backup configuration (for example, a CDP configuration). Determining the propriety of migrating from an existing backup method to another backup method is difficult. Japanese Patent Laid-open No. 2007-140746 discloses CDP configuration design technology, but does not offer a disclosure related to determining whether or not it is appropriate to migrate from an existing backup configuration to the CDP configuration.

SUMMARY

Therefore, an object of the present invention is to make it possible to determine whether or not it is appropriate to migrate from an existing backup configuration to a different backup configuration.

Other objects of the present invention should become clear from the following explanation.

For a storage system, which retains backup data of a first data storage extent in one or more second data storage extents using a first backup method, the backup status in the first backup method at a prescribed period is acquired, and a first backup performance in a first backup configuration is computed based on this backup status. Meanwhile, a second backup performance in a second backup configuration is estimated based on a prescribed assumption at a prescribed period. Information based on the computed first backup performance and the estimated second backup performance is outputted.

BRIEF DESCRIPTION OF THE DRAWINGS

FIG. 2 shows an example of the constitution of a replicated data management table stored by the storage system;

FIG. 6 shows an example of the constitution of a determination criteria management table stored by a management computer;

FIG. 9 shows an example of the constitution of a monitoring information management table stored by the management computer;

FIG. 10 shows an example of the constitution of a performance information management table stored by the management computer;

FIG. 14 shows an example of the constitution of a CDP management table stored by the storage system in the second embodiment of the present invention.

DESCRIPTION OF THE PREFERRED EMBODIMENT

Figure 1:
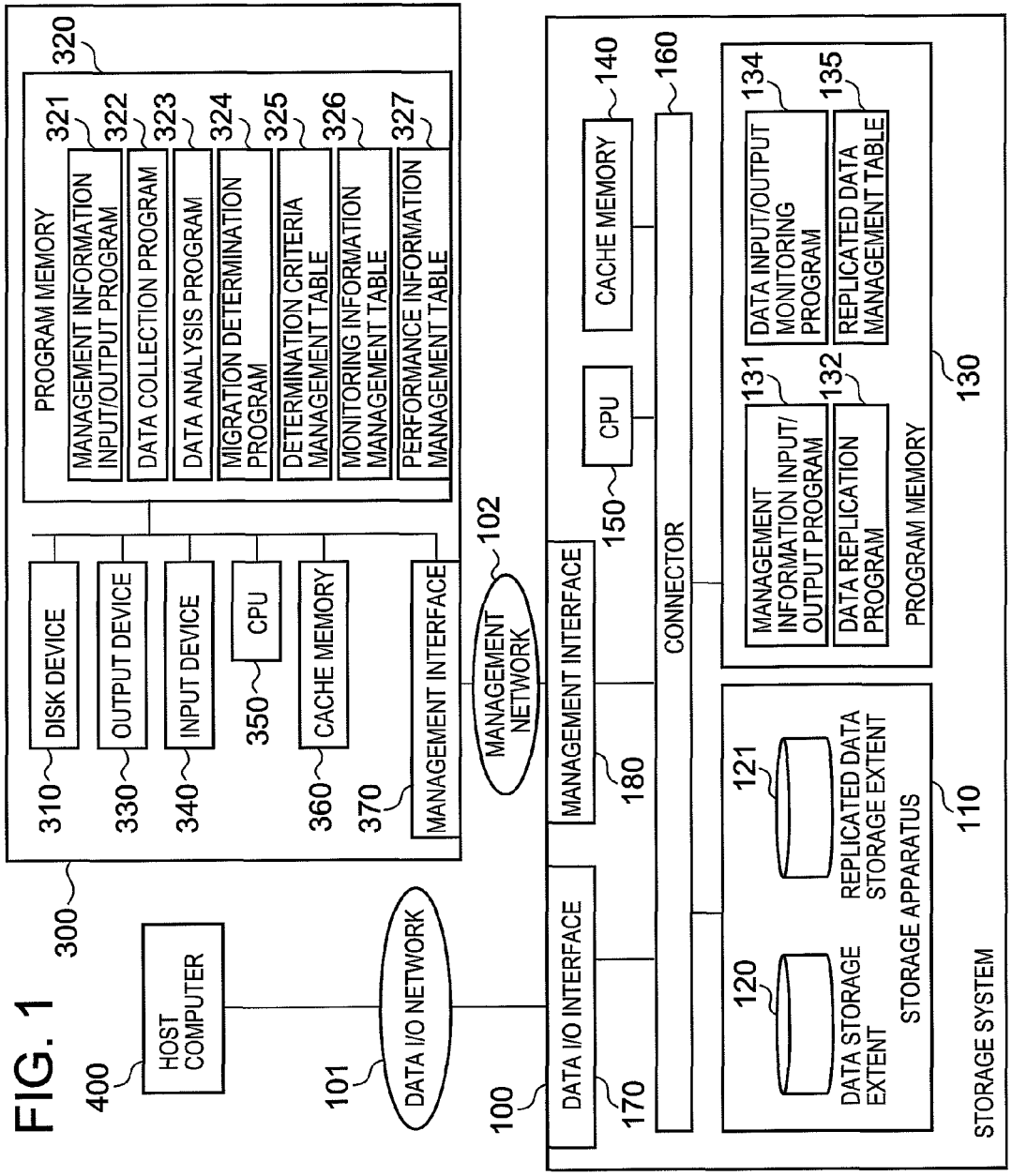
FIG. 1 shows an example of the constitution of a computer system in a first embodiment of the present invention.

In Embodiment 1, a storage system comprises a plurality of data storage extents, writes write-data conforming to a write request to a first data storage extent specified in this write request, and retains the backup data of this first data storage extent in one or more second data storage extents in use of a first backup method. A computer comprises an acquisition module for acquiring a backup status using the first backup method at a prescribed period for this storage system; a computation module for computing a first backup performance using a first backup configuration (a configuration defined by a first corresponding relationship between the first data storage extent and the one or more second data storage extents, and a first backup method) based on the acquired backup status; an estimation module for estimating a second backup performance using a second backup configuration (a configuration defined by a second corresponding relationship between the first data storage extent and one or more second data storage extents, and a second backup method) based on a prescribed assumption for the above-mentioned prescribed period; and an output module for outputting information based on the computed first backup performance and the estimated second backup performance.

The estimation module can assume that the first data storage extent in the second backup configuration is the first data storage extent in the first backup configuration, and can also assume that the second data storage extent (and/or the storage capacity of one or more second data storage extents) in the second backup configuration is the second data storage extent (and/or the storage capacity of one or more second data storage extents) in the first backup configuration.

In Embodiment 2 according to Embodiment 1, the computer further comprises a reception module for receiving a write-amount, which is the amount of write-data at each point-in-time interval for the first data storage extent in the storage system. The acquisition module acquires the respective write times at which data was written to a second data storage extent in use of the first backup method for a prescribed period. The computation module computes a first data protection period, which is a time period from the oldest time at which backup data is recoverable using the first backup method until a targeted time, for the respective targeted times in a prescribed period, based on the respective acquired write times. The estimation module estimates a second data protection period, which is a time period from the oldest time at which backup data is recoverable using the second backup method until a targeted time, for the respective targeted times in a prescribed period, based on the write-amount at each received point-in-time interval.

In Embodiment 3 according to Embodiment 2, the second backup configuration is a CDP backup configuration executed by a backup method conforming to CDP technology. The second data storage extents in the second backup configuration include a base data storage extent, in which base data which is a replication of data stored in the first data storage extent is stored, and a journal storage extent, in which a journal which is information related to the write history for the first data storage extent and which is reflected in the base data, is stored. The estimation module estimates the amount of stored journals, which is the amount of journals stored in the journal storage extent, for the respective targeted times in a prescribed period based on the write-amount at each received point-in-time interval, and estimates a second data protection period for the respective targeted times based on the write-amount at each received point-in-time interval and the amount of stored journals at the respective targeted times.

In Embodiment 4 according to Embodiment 3, the estimation equation for the amount of stored journals $C_T$ at the respective targeted times is:

$$C_T = C_{T-1} + (I_T - O_T)$$

$C_{T-1}$ is the amount of stored journals at the immediately prior targeted time. $I_T$ is an input quantity, which is the amount of journals inputted to the journal storage extent at a targeted point-in-time interval from the immediately prior targeted time until the current targeted time. $O_T$ is an output quantity, which is the amount of journals deleted from the journal storage extent at a targeted time-period interval.

In Embodiment 5 according to any of Embodiments 2 to 4, the reception module further receives the storage capacity of one or more second data storage extents in the first backup configuration. The above-mentioned prescribed assumptions include the assumption that the one or more second data storage extents in the second backup configuration have the same storage capacity as the storage capacity of the one or more second storage extents in the first backup configuration.

In Embodiment 6 according to Embodiment 5, the computer can further comprise an assumption receiving module for receiving from a user an assumption input that differs from the above-mentioned prescribed assumption. In this case, the estimation module estimates the second backup performance based on a different assumption inputted from the user. More specifically, for example, the assumption receiving module has the storage capacity of one or more second data storage extents in the second backup configuration, and receives from the user a storage capacity input, which differs from the storage capacity of the one or more second data storage extents in the first backup configuration. The estimation module estimates the second backup performance based on the above-mentioned different storage capacity inputted from the user. In this embodiment, the output module can display a second backup performance estimated based on a pre-change assumption alongside a second backup performance estimated based on a post-change assumption.

In Embodiment 7 according to any of Embodiments 1 to 6, the first backup performance, in addition to a first data protection period, has at least one of a storage capacity of one or more second data storage extents in the first backup configuration, continuity of backup times for recoverable backup data, and a fluctuation range of the first data protection period. The second backup performance, in addition to a second data protection period, has at least one of a storage capacity of one or more second data storage extents in the second backup configuration, continuity of backup times for recoverable backup data, and the fluctuation range of the second data protection period.

In Embodiment 8 according to Embodiment 7, the computer further comprises a scoring module for carrying out scoring. The scoring module computes a score for the determination item of the first data protection period, and at least one determination item from among the respective determination items of the storage capacity of one or more second data storage extents in the first backup configuration, the continuity of backup times for recoverable backup data, and the fluctuation range of the first data protection period, based on the result of comparing the first backup performance corresponding to the determination item with a reference value, and/or the result of comparing the first backup performance corresponding to the determination item with the second backup performance. Further, the scoring module computes a score for the determination item of the second data protection period, and at least one determination item from among the respective determination items of the storage capacity of one or more second data storage extents in the second backup configuration, the continuity of backup times for recoverable backup data, and the fluctuation range of the second data protection period, based on the result of comparing the second backup performance corresponding to the determination item with a reference value, and/or the result of comparing the first backup performance corresponding to the determination item with the second backup performance.

In Embodiment 9 according to Embodiment 8, the scoring module calculates a total score, which is calculated on the basis of the score of each determination item, and/or not less than two scores of each backup configuration, based on a weighting coefficient for each determination item.

In Embodiment 10 according to any of Embodiments 1 to 9, the output module displays the computed first backup performance alongside the estimated second backup performance.

In Embodiment 11 according to any of Embodiments 1 to 10, the computer further comprises a determination module. The determination module compares the computed first backup performance with the estimated second backup performance, and determines that the superior of these performance is the appropriate backup configuration. The output module outputs information based on the determination result as information based on the computed first backup performance and the estimated second backup performance.

In Embodiment 12 according to Embodiment 11, information based on the above-mentioned determination result is an instruction for changing from the above-mentioned first backup configuration to the above-mentioned second backup configuration, and is information, which is sent to the storage system.

At least two or more of the above-described Embodiments 1 to 12 can be combined. Further, at least one of the above-described acquisition module, computation module, estimation module, output module, reception module, assumption receiving module, scoring module and determination module can be constructed from hardware, a computer program, or a combination of these (for example, a portion of these modules can be realized via computer programs, and the remainder can be realized using hardware). A computer program is executed by being read into a prescribed processor. Further, a storage area residing in a hardware resource, such as a memory, can be arbitrarily used when performing information processing, which is carried out by reading a computer program into the processor. Further, a computer program either can be installed in the computer from a CD-ROM or other such recording media, or can be downloaded to the computer via a communication network.

The first and second embodiments of the present invention will be explained below by referring to the figures. The first embodiment is constituted such that, when a fixed-time backup configuration has already been constructed in the storage system, but a CDP backup configuration has not been constructed in the storage system, it is easy for the user (for example, the administrator) to determine whether it is appropriate to migrate from the fixed-time backup configuration to the CDP backup configuration. According to the fixed-time backup configuration, replications of data at certain backup acquisition times in a data storage extent (for example, a primary logical volume) are regularly stored in a replicated data storage extent, which has the oldest generation (the backup acquisition time that is the furthest in the past) of one or more replicated data storage extents (for example, secondary logical volumes) prepared from this data storage extent. Conversely, the second embodiment is constituted such that, when a CDP backup configuration has already been constructed in the storage system, but a fixed-time backup configuration has not been constructed in the storage system, the user can easily determine the appropriateness of migrating from the CDP backup configuration to the fixed-time backup configuration.

First Embodiment

FIG. 1 is a diagram showing the constitution of a computer system in the first embodiment of the present invention.

A host computer 400 is connected to a storage system 100 via a data I/O network 101, and issues an I/O request (a data write request and a data read request) to the storage system 100. The data I/O network 101 is a communication network, such as a fibre channel or IP network, and, for example, is a SAN (Storage Area Network).

There is a management computer 300, which carries out management related to the data communications of the storage system 100 and the host computer 400. The management computer 300 is connected to the storage system 100 via a management network 102. The management network 102 is a communication network, such as an IP network, and, for example, is a LAN (Local Area Network). Further, this management network 102 can also be a constitution, which shares the same elements with the above-mentioned data I/O network 101. The management computer 300 and storage system 100 send and receive information to and from one another via this management network 102. Hereinafter, the information transceived between the management computer 300 and storage system 100 will be referred to as "management information".

Further, the storage system 100 has a connector (for example, a bus or switch) 160 on the inside, and a storage apparatus 110, program memory 130, cache memory 140, CPU (Central Processing Unit) 150, data I/O interface 170, and management interface 180 are respectively connected to the connector 160. Communications with machines outside the storage system 100 are carried out via the data I/O interface 170 and management interface 180.

The cache memory 140, for example, is a volatile memory. The cache memory 140 temporarily stores data, which is written to a storage apparatus 110 (for example, a data storage extent 120) in accordance with a write request (write-data), and data, which is read out from a storage apparatus 110 in accordance with a read request (read-data).

The storage apparatus 110, for example, is constituted from one or more storage media drives (for example, hard disk drives, flash memory drives, and so forth). A plurality of logical volumes is created based on the storage space of the storage apparatus 110. As a logical volume, there is a data storage extent 120 specified by a write request or a read request from the host computer 400, and a replicated data storage extent 121 for storing replicated data (backup data), which is the replication of data at specified times in a data storage extent 120. Furthermore, there is no need to restrict the capacity or number of data storage extents 120 and replicated data storage extents 121.

The program memory 130, for example, is a nonvolatile memory, and stores the variety of programs and information responsible for operating the storage system 100. The various computer programs are executed by the CPU 150. The computer programs include a management information input/output program 131, a data replication program 132, and a data input/output monitoring program 133, and the information includes a replicated data management table 134. The computer programs and table stored in the program memory 130 will be explained hereinbelow. Furthermore, hereinafter, when a computer program is the subject, it is supposed that processing is actually being carried out by the CPU, which executes this computer program.

Figure 11:
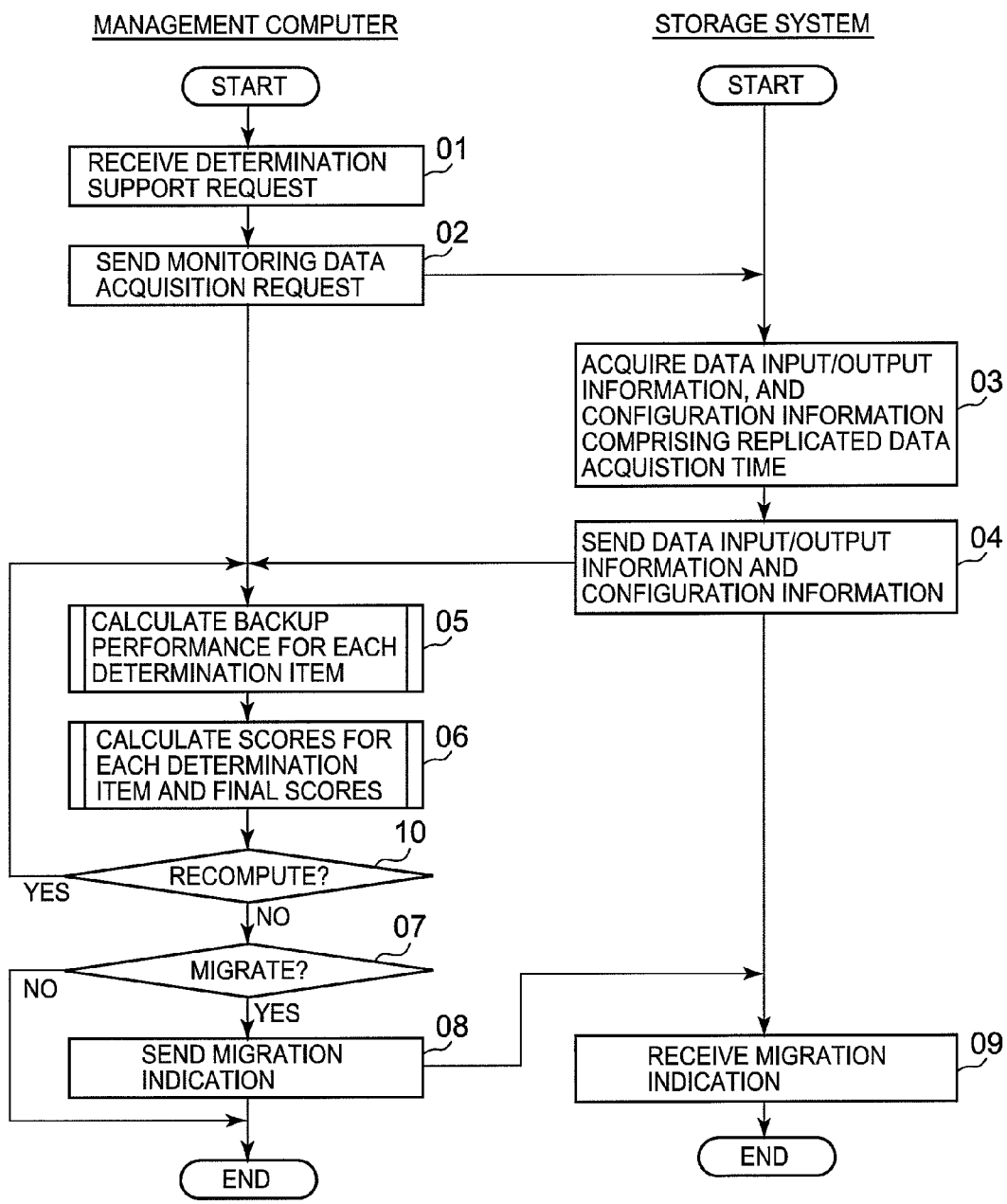
FIG. 11 shows the flow of processing carried out by the first embodiment.

The management information input/output program 131 sends and receives management information between the storage system 100 and the management computer 300. Further, the management information input/output program 131 transfers received management information to either a program or table inside the program memory 130. For example, the management information input/output program 131, upon receiving a monitoring data acquisition request from the management computer 300, transfers this request to the data input/output monitoring program 134. Furthermore, as will be explained by referring to FIG. 11, management information includes a monitoring data acquisition request, amount of write-data at each point-in-time interval, information recorded in the replicated data management table 135, and a migration indication.

The data replication program 132 stores a replicate of data inside a data storage extent 120 at a prescribed time in a replicated data storage extent 121. This program 132 is operated by a fixed-time backup configuration, which is the existing backup configuration in this embodiment. The timing at which replicated data is to be created is indicated by either the host computer 400 or the management computer 300 (for example, by the user, who is operating this computer, or by an automated scheduler). Further, the data replication program 132 updates the replicated data management table 135, which will be described hereinbelow, subsequent to the end of a data replication process. More specifically, for example, the identifier of replicated data storage extent 121, which is the storage destination of the replicated data, the backup generation (the chronological order number of the backup data), the acquisition time (the time at which the replicated data was created and stored), and the storage capacity of this replicated data storage extent 121 are made correspondent to the copy source data storage extent 120 of this replicated data storage extent 121 in this table 135.

The data input/output monitoring program 134 acquires input/output-related management information from the host computer 400 relative to the monitoring-targeted data storage extent 120 in a monitoring period described in the monitoring data acquisition request received from the management computer 300. This management information comprises at least the amount of write-data (hereinafter, write-amount) received from the host computer 400 in the data acquisition interval (point-in-time interval) described in the monitoring data acquisition request. Further, the write-amount can also be an average value, or the total value (total amount) of the amount of write-data in the pertinent data acquisition interval. In the case of an average value, it is possible to calculate the total amount by multiplying the data acquisition interval by the average value. In addition thereto, the maximum value and/or minimum value of the amount of write-data can also be acquired. Furthermore, the data input/output monitoring program 134 acquires the time at which the replicated data was created for the pertinent data storage extent 120 via the data replication program 132 in the specified monitoring period, and the identifier of the replicated data storage extent 121 in which replicated data was stored at this time.

The replication data management table 135 records information related to the replication of data retained in a data storage extent 120 inside the storage system 100.

FIG. 2 shows an example of the constitution of the replicated data management table 135. Furthermore, in the following explanation, a data storage extent and a replicated data storage extent may be denoted by the identifier thereof instead of a reference numeral.

A field 1350 of the replicated data management table 135 records the identifier of the replication-targeted (copy source) data storage extent 120, a field 1351 records information denoting the storage capacity of this data storage extent 120, a field 1352 records the generation number of the replication (backup) relative to the replication-targeted data storage extent, a field 1353 records the identifiers of the respective replicated data storage extents storing the acquired replicated data, a field 1354 records information denoting the times at which the respective replicated data were acquired, and a field 1355 records information denoting the storage capacities of the respective replicated data storage extents.

For example, according to FIG. 2, it is clear that there are three generations of replicated data about data storage extent 00:01, first generation replicated data is stored in replicated data storage extent 0A:03, second generation replicated data is stored in replicated data storage extent 0A:02, third generation replicated data is stored in replicated data storage extent 0A:01, and the data storage extent 00:01, as well as the three replicated data storage extents 0A:01, 0A:02, and 0A:03 have 100 MB (megabytes) of storage capacity. The larger the generation number, the younger the backup generation, the newest replicated data is "01", and as the acquisition time becomes older, the generation number increases. That is, in FIG. 2, the newest replicated data was acquired on Jul. 19, 2007 at 00 hours 00 minutes, and the generation number is "01". Further, the next newest replicated data was acquired on Jul. 18, 2007 at 00 hours 00 minutes, and the generation number increases by one to become "02". In this embodiment, generation numbers are assigned to replicated data like this, and the largest of the generation numbers is the number of replicated data residing in the data storage extent 120. Accordingly, the combination of the generation number and replicated data storage extent identifier changes with the acquisition of replicated data. The assigning of generation numbers (for example, the beginning value and/or order) can be a different system.

Refer to FIG. 1 once again. The management computer 300 will be explained below.

The management computer 300 has a disk device (for example a hard disk drive) 310 (can also be another kind of storage media drive), program memory 320, output device 330, input device 340, CPU 350, cache memory 360, and management interface 370, and these are connected, for example, via a bus. The hardware configuration of the management computer 300, for example, can also be the same as that of a general-purpose computer (a personal computer). For example, the input device 340 can be a keyboard or mouse, and the output device 330 can be a CRT (Cathode Ray Tube), LCD (Liquid Crystal Display), or other such display device and video output device. Similarly, for example, the management interface 370 can be an Ethernet (registered trademark) or other such general-purpose communication device. Further, for example, the program memory 320 can be a magnetic storage apparatus- or semiconductor storage apparatus-based data storage device.

The program memory 320, for example, stores a management information input/output program 321, data collection program 322, data analysis program 323, migration determination program 324, determination criteria management table 325, and monitoring information management table 326. The computer programs stored in the program memory 320 are read into and executed by the CPU 350. Further, when the CPU 350 executes the various computer programs, the tables stored in the program memory 320 are arbitrarily referenced.

The programs and tables stored in the program memory 320 inside the management computer 300 will be explained below.

The management information input/output program 321 sends and receives management information between the management computer 300 and the storage system 100. Further, the management information input/output program 321 transfers management information received from the storage system 100 to either a program or table inside the program memory 320. That is, by executing the management information input/output program 321, the CPU 350 can store received management information in the program memory 320, or use the management information to execute another program.

The data collection program 322 collects management information related to the storage system 100 by way of the management information input/output program 321. More specifically, for example, the data collection program 322 accepts a backup configuration migration determination request from the user, and upon receiving this request, issues a monitoring data acquisition request to the storage system 100. Then, in accordance with this request, the data collection program 322 receives management information acquired by the data input/output monitoring program 134 of the storage system 100 (for example, the above-mentioned write-amount of each data acquisition interval), and information recorded in the replicated data management table 135 (the number of generations of replicated data relative to the targeted data storage extent 120, the storage capacity of the respective replicated data storage extents, and the acquisition times of the respective generations). A monitoring data acquisition request comprises information (identifier of monitoring-targeted storage extent, monitoring period, and data acquisition interval) recorded in the monitoring information management table 326, which will be explained hereinbelow.

The data analysis program 323 uses the management information collected by the data collection program 322, computes the data protection period in the fixed-time backup configuration, and estimates the data protection period when the CDP backup configuration is assumed. The data protection period is the period during which backup data is retained, and denotes how far back from a targeted point-in-time (for example, the present) it is possible to recover data of a previous point-in-time. The data analysis program 323 also calculates other determination items mentioned in the determination criteria management table 324, which will be described hereinbelow using FIG. 6.

The respective methods for calculating the data protection period in the fixed-time backup configuration, and the data protection period in the CDP backup configuration will be explained below.

<(1) Data Protection Period in Fixed-Time Backup Configuration>

In the fixed-time backup configuration, either one or a plurality of replicated data storage extents 121 are provided for data (source data) of a backup-targeted data storage extent 120, and replicated data of a specified time is stored in a replicated data storage extent 121 selected from among this replicated data storage extents 121. For example, according to the replicated data management table 135 shown in FIG. 2, three replicated data storage extents 0A:01, 0A:02, and 0A:03 are provided for one data storage extent 00:01, and replicated data acquired at a certain backup acquisition time is stored in the replicated data storage extent with the oldest acquisition time of these three replicated data storage extents 0A:01, 0A:02, and 0A:03.

With this fixed-time backup configuration in view, the data protection period of one replicated data (one generation) is calculated using (Equation 1) below. It is supposed that time T is a time in a range of times from the replicated data acquisition time until this replicated data is updated by replicated data of a different time.

[Data Protection Period of Replicated Data (Generation) at Time $T$]=[Time $T$]−[Replicated Data Acquisition Time]     (Equation 1)

A data protection period, which takes all generations into account, is the maximum value of the results of (Equation 1) calculations for a plurality of data storage extents. That is, when the number of generations is N, the data protection period of data (source data) stored in the pertinent data storage extent at time T (one data storage extent corresponding to a plurality of replicated data storage extents) is calculated using (Equation 2) below.

[Data Protection Period of Pertinent Data Storage Extent at Time $T$]=Max(([Time $T$]−[Generation 1 Acquisition Time]), ([Time $T$]−[Generation 2 Acquisition Time]), . . . ,([Time $T$]−[Generation N Acquisition Time]))     (Equation 2)

Figure 3:
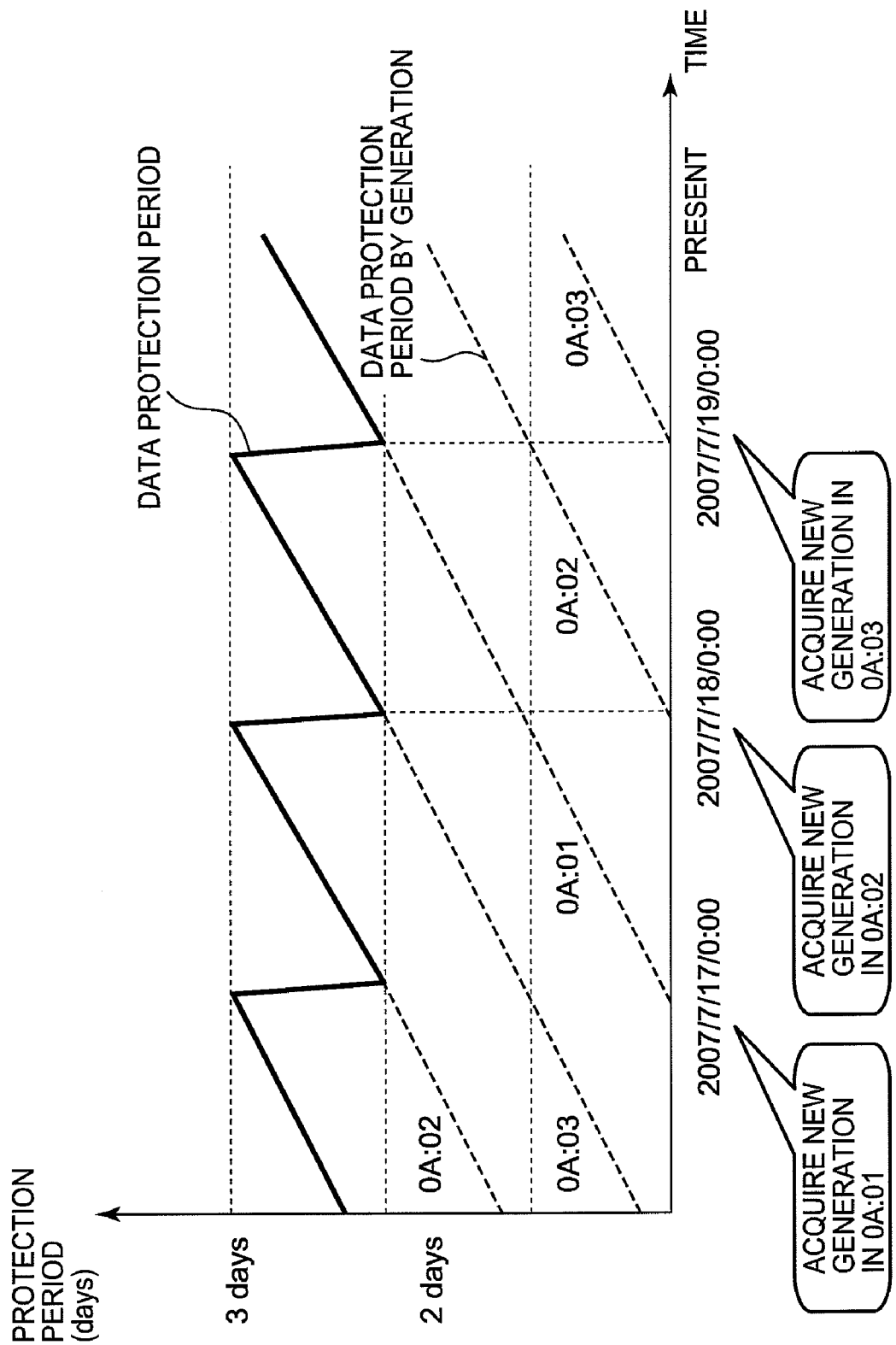
FIG. 3 shows an example of a data protection period in a fixed-time backup configuration.

For example, according to the example in the replicated data management table 135 shown in FIG. 2, a data protection period in accordance with the above-mentioned (Equation 2) would become:

[Data Protection Period of Data Storage Extent 00:01 at Time T]=Max(([Time T]−[0A:01 Replication Acquisition Time]), ([Time T]−[0A:02 Replication Acquisition Time]), ([Time T]−[0A:03 Replication Acquisition Time])). FIG. 3 shows the result obtained by plotting the results of this computation on a time axis. In FIG. 3, the broken lines show the respective data protection periods of the three replicated data storage extents 0A:01, 0A:02, 0A:03, and the solid line shows the data protection period for the pertinent data storage extent 00:01.

Furthermore, in this first embodiment, the management computer 300 can determine the acquisition times of the respective generations by receiving from the storage system 100 the information recorded in the storage system 100-managed replicated data management table 135, but in the second embodiment, since acquisition time such as this is not managed by the storage system 100, it is possible to assume that a time (for example, at 00 hours 00 minutes each day) in a point-in-time interval (for example, daily) specified by the user is the acquisition time.

<(2) Data Protection Period in CDP Backup Configuration>

In the CDP backup configuration, for example, data storage extent replicated data (hereinafter, called "base data") of a certain point in time is acquired, and a journal, which was acquired at a later time than the base data acquisition time, is stored. When recovering data of a certain time in the past (hereinafter, specified recovery time), data at the specified recovery time is recovered by reflecting in the base data journals corresponding to the respective update times up until the specified recovery time.

A journal, for example, is constituted from journal meta data and journal data. As for journal data, for example, when a journal is a so-called after-journal, the journal data is write-data written to a data storage extent (that is, post-update write-data), and when a journal is a so-called before-journal, the journal data is write-data prior to being updated by the write-date written to the data storage extent. Journal meta data, for example, is management data, such as the update time (when data was written), update number, and update location (the location in the data storage extent where a write occurred). A journal can be stored in a journal storage extent (logical volume), which will be explained hereinbelow, journal data can be stored in the journal storage extent, and journal meta data can be stored in a different storage extent, such as a memory in the storage system 100.

Reflecting a journal in the base data signifies the fact that the journal data inside this journal is written to the update location specified from the journal meta data inside this journal. The source data of respective update times is sequentially restored by sequentially reflected in the base data journals, from the oldest unreflected journal to the journal corresponding to the specified recovery time, ultimately recovering the source data of the specified recovery time. That is, in the CDP backup configuration, continuous data protection is possible.

To construct a CDP backup configuration, it is necessary to determine the storage capacity of the base data storage extent in which the base data will be stored, and the storage capacity of the journal storage extent in which a journal (for example, journal data only) will be stored.

In this embodiment, the storage capacity of the base data storage extent is the same as the storage capacity of the data storage extent 120 that constitutes the protection target. Using the example shown in FIG. 2, since the data storage extent 00:01 is 100 MB, the storage capacity of the base data storage extent will also be 100 MB.

Then, the total storage capacity of the storage extents required for storing base data as well as journals in the CDP backup configuration (for convenience sake, called "backup retention capacity" hereinafter), for example, is specified in the determination criteria management table 325, which will be explained hereinbelow using FIG. 6. The capacity required for the storage of journals is the value obtained by subtracting the storage capacity of the base data storage extent from the backup retention capacity. More specifically, for example, if the backup retention capacity is 300 MB, the storage capacity required for the storage of journals will be the value obtained by subtracting the 100 MB storage capacity of the base data storage extent from the 300 MB of backup retention capacity, that is, 200 MB.

The data protection period at a certain time T is calculated based on the transition of the write-amount relative to the protection-targeted data storage extent 120, and the total amount of unreflected journals (hereinafter, amount of stored journals). In the second embodiment described below, this amount of stored journals can be the total amount of unreflected journals actually stored in the storage system 100, and is treated as a measured value that is acquirable from the storage system 100, but in this first embodiment, since unreflected journals are not actually stored, the amount of stored journals is a value, which is calculated using the below-described computational equation for estimating amount of stored journals.

Further, the base data storage extent and the journal storage extent do not actually exist prior to migration to the CDP backup configuration, and it is supposed that subsequent to migrating from the existing backup configuration to the CDP configuration the storage extents (that is, the replicated data storage extents 121) being used in current backup applications will be utilized. More specifically, for example, according to the data analysis program 323 it is assumed that one of the replicated data storage extents 0A:01, 0A:02, 0A:03 will become the base data storage extent, and the remaining two will become the journal storage extent.

Further, in this embodiment, it is assumed that the sizes of write-data and a journal are 1:1. That is, it is supposed that journal data, which is the same quantity as write-data, is written to the journal storage extent (and it is supposed that journal meta data is stored in another storage extent). The size of a journal can be properly estimated in accordance with the storage system regardless of the above assumptions.

The amount of stored journals $C_T$ stored in a journal storage extent at a certain time T is calculated by the data analysis program 323 using the following (Equation a).

$$C_T = C_{T-1} + (I_T - O_T) \quad \text{(Equation a)}$$

$C_{T-1}$ denotes the amount of stored journals at the data acquisition time (T−1) immediately prior to the time T, $I_T$ denotes the amount of journals written in the journal storage extent at time T, and $O_T$ denotes the amount of journals deleted at time T.

$I_T$ is calculated using the following (Equation b).

$$I_T = \text{Min}(W_T + W'_{T-1}, P_j, V - C_{T-1}) \quad \text{(Equation b)}$$

That is, the smallest value from among $(W_T + W'_{T-1})$, $P_j$, and $(V - C_{T-1})$ is $I_T$. $P_j$ is the value obtained by multiplying the point-in-time interval from time (T−1) to time T (for example, the data acquisition interval) by the amount of journals capable of being written to the journal storage extent per unit of time (that is, journal write performance (for example, the unit is MB/second)). $(V - C_{T-1})$ denotes the amount of free capacity in the journal storage extent. V is the storage capacity of the journal storage extent. $(W_T + W'_{T-1})$ denotes the amount of journals capable of being written to the journal storage extent. More specifically, $W_T$ is the total amount of write-data received from the host computer 400 between time (T−1) and time T, and $W'_{T-1}$ is the total amount of unsaved journals, which were not written to the journal storage extent from time (T−2) to time (T−1). Incidentally, $W'_T$ is calculated using the following (Equation c).

$$W'_T = (W_T + W'_{T-1}) - I_T \quad \text{(Equation c)}$$

$O_T$ is calculated using the following (Equation d).

$$O_T = \text{Min}(\text{Max}(0, C_{T-1} + I_T - H), P_D) \quad \text{(Equation d)}$$

That is, the minimum value from among the maximum value of O and $(C_{T-1} + I_T - H)$, and $P_D$ is $O_T$. H is a threshold, which is compared against the amount of stored journals, and when the amount of stored journals exceeds H, the excess amount of journals (that is, the quantity of journals denoted by $(C_{T-1} + I_T - H)$) is reflected in the base data. $P_D$ is journal deletion performance, and is defined as follows:

(when $P_j \leq P_B$)

$$P_D = P_j - I_T$$

(when $P_j > P_B$)

$$P_D = \text{Min}(P_j - I_T, P_B)$$

That is, when $P_j > P_B$, the minimum value of $(P_j - I_T)$ and $P_B$ is $P_D$. $P_B$ is the value obtained by multiplying the point-in-time interval from time (T−1) to time T (for example, the data acquisition interval) by the amount of data capable of being written to the base data storage extent per unit of time (that is, base data write performance (for example, the unit is MB/second)). The values for journal write performance and base data write performance can utilize the input/output performance recorded in a performance information management table 327, which will be explained below using FIG. 10.

Figure 4:
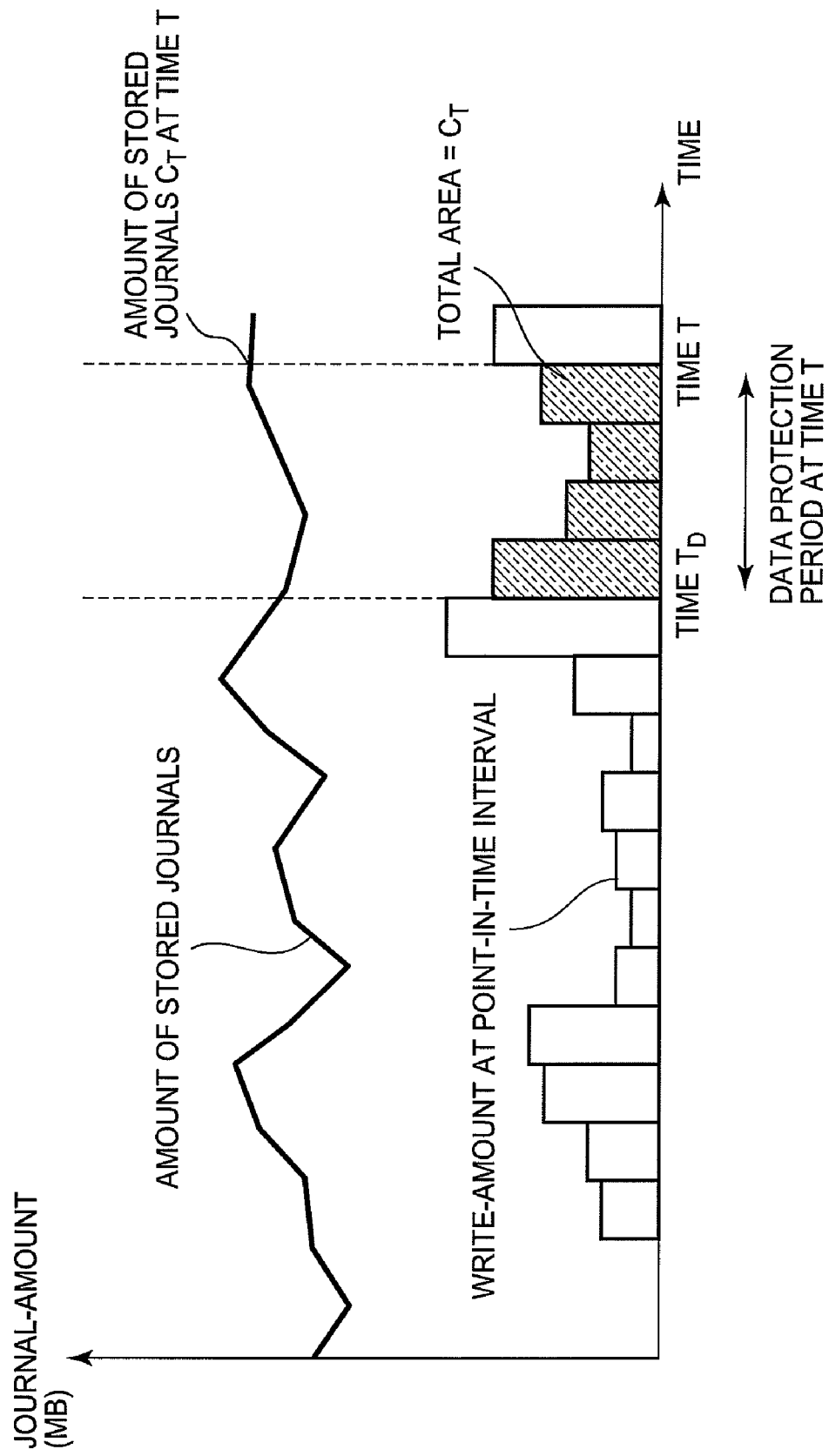
FIG. 4 is a diagram of data protection period calculation method in a CDP backup configuration.

FIG. 4 shows an example of the results of plotting the amount of stored journals at time T and the write-amount of write-data (value assumed to be the journal write-amount) at the respective point-in-time intervals (for example, data acquisition intervals). To calculate the data protection period at time T, the write-amounts at each of the point-in-time intervals going back from time T are totaled, and the time $T_D$ at which the total value reaches the amount of stored journals $C_T$ of time T is determined. The data protection period at time T constitutes the period from time $T_D$ to time T. In other words, $T_D$ is the oldest time for data recoverable at time T.

Figure 5:
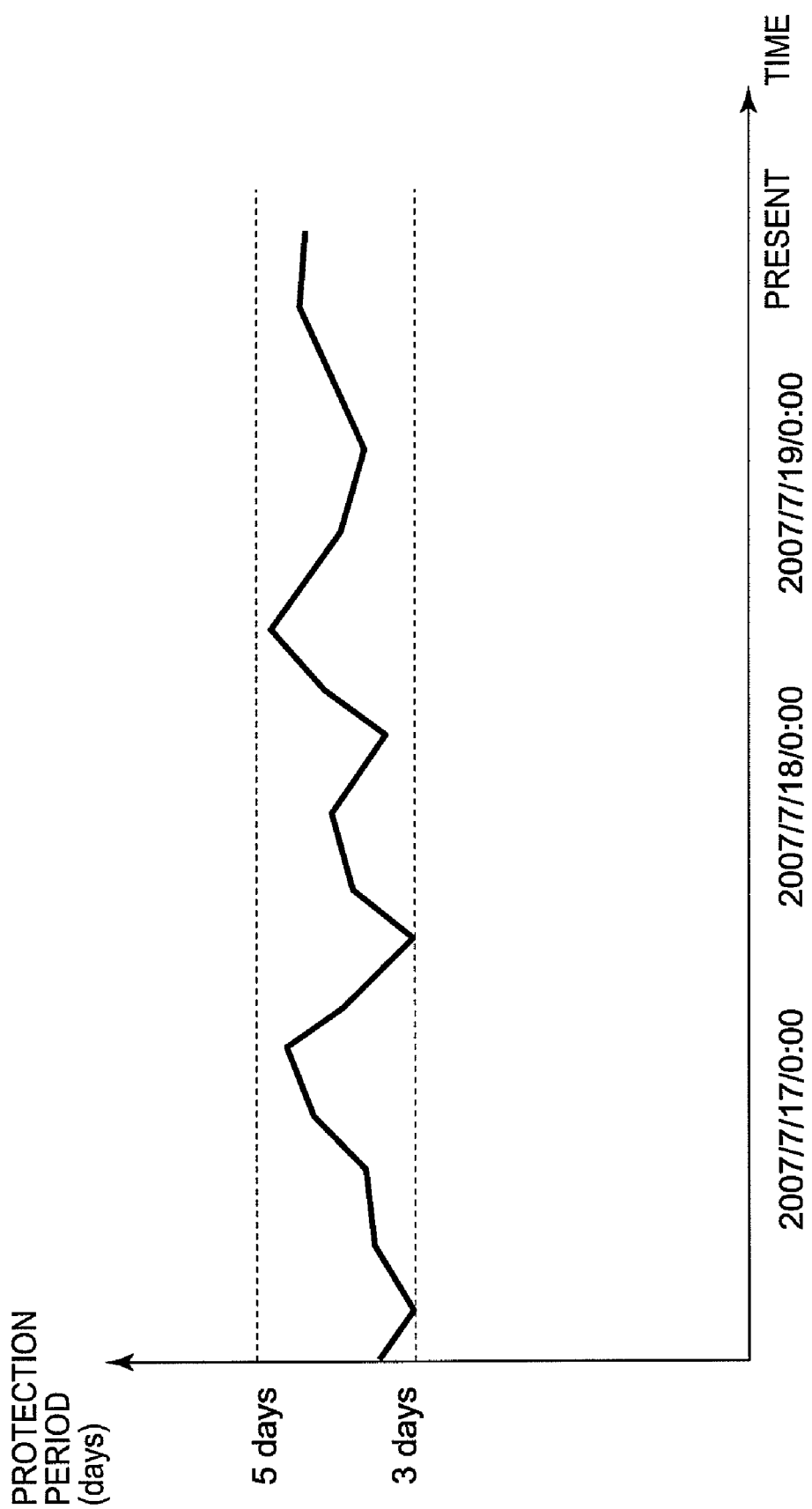
FIG. 5 shows an example of the transition of a data protection period in a CDP backup configuration.

FIG. 5 shows an example of the results of plotting a data protection period in the CDP backup configuration determined in this way on a time line. The example of FIG. 5 shows that the data protection period changes over time, and that the minimum value thereof is three days, and the maximum value is five days.

If a data protection period for the fixed-time backup configuration has been computed, and a data protection period for the CDP backup configuration has been estimated, the data analysis program 323 calculates a value, other than a data protection period, for each determination item described in the determination criteria management table 325. In the determination criteria management table 325 example of FIG. 6, determination items other than the data protection period include recovery point continuity, backup capacity, and data protection period fluctuation range.

As used here, recovery point continuity signifies the interval between a recovery-possible point in time in the past, that is, a recovery point, and the subsequent recovery point. For example, according to the time-line transitions of the data protection period in the fixed-time backup configuration illustrated in FIG. 3, because a new generation of backup data is acquired every other day, the recovery point interval is one day. Conversely, in the CDP backup configuration, since the source data at all the points in time at which data write processing has ended is recoverable, the recovery point interval is the minimum unit of time (in this embodiment, seconds). Therefore, the data analysis program 323 calculates recovery point continuity as one day for the fixed-time backup configuration, and as one second for the CDP backup configuration.

Backup capacity denotes the storage capacity required for storing backup data (replicated data in the fixed-time backup configuration, and base data and journals in the CDP backup configuration) of source data (protection-targeted data) in a data storage extent 120. For example, according to the replicated data management table 135 shown in FIG. 2, in order to retain three backup generations for a 100 MB data storage extent 120, a backup capacity of 100 MB×3=300 MB is needed. Conversely, in the CDP backup configuration, the storage capacity, which was taken into account in the computation of the above-described estimate (more specifically, a total storage capacity of 300 MB, since there is a 100 MB base data storage extent and a 200 MB journal storage extent) is required as the backup capacity. Therefore, the data analysis program 323 calculates 300 MB as the backup capacity for the fixed-time backup configuration, and calculates 300 MB for the CDP backup configuration as well.

The data protection period fluctuation range is the difference between the maximum and minimum data protection period. For example, according to the example for the fixed-time backup configuration shown in FIG. 3, one day, which is the difference between the maximum data protection period of three days and the minimum data protection period of two days, is the data protection period fluctuation range. Conversely, according to the example for the CDP backup configuration shown in FIG. 5, two days, which is the difference between the maximum data protection period of five days and the minimum data protection period of three days, is the data protection period fluctuation range. Therefore, the data analysis program 323 calculates the data protection period fluctuation range as one day for the fixed-time backup configuration, and as two days for the CDP backup configuration.

The determination criteria management table 325 retains elements, which form the bases for calculating scores for determination items, for each determination item deemed useful for the user to determine whether or not it is appropriate to migrate from the existing backup configuration to a different backup configuration. More specifically, in the determination criteria management table 325, determination items, which constitute target parameters for making a determination, are recorded in field 3250, criteria values for the respective determination items are recorded in field 3251, determination criteria for the respective determination items are recorded in field 3252, and weighting coefficients for the respective determination items are recorded in field 3253. The weighting coefficient is used when the migration determination program 324 carries out scoring for the respective determination items. The weighting coefficients for the respective determination items, for example, are allocated such that totaling all of the weighting coefficients for all of the determination items equals 1, and the larger the weighting coefficient, the higher the priority of the determination item corresponding thereto.

For example, in the example shown in FIG. 6, there are four determination items: "data protection period", "recovery point continuity", "backup capacity" and "data protection period fluctuation range", and the weighting coefficient for "data protection period" is 0.4. In this example, it is clear that the weighting coefficient 0.4 is the largest value among the determination items, and that the determination item "data protection period" has the highest priority.

The user need not input at least one of the determination item, criteria value, determination criteria and weighting coefficient. In this case, values calculated for the existing backup configuration can be recorded in the determination criteria management table 325 for the respective determination items. This is so the user can easily determine the advantages and disadvantages of migrating to the CDP backup configuration by comparing the values in the existing backup configuration against the values in the CDP backup configuration. Further, the merit, in this case, is that the burden on the user is lessened since the user need not make an input.

However, it is not always necessary to eliminate the need for a user input, and at least one of the determination item, criteria value, determination criteria and weighting coefficient is inputted by the user. More specifically, for example, the user can input at least one of the determination item, criteria value, determination criteria and weighting coefficient via a GUI (Graphical User Interface) displayed on the output device 330 of the management computer 300 as shown in the example of FIG. 7.

Figure 7:
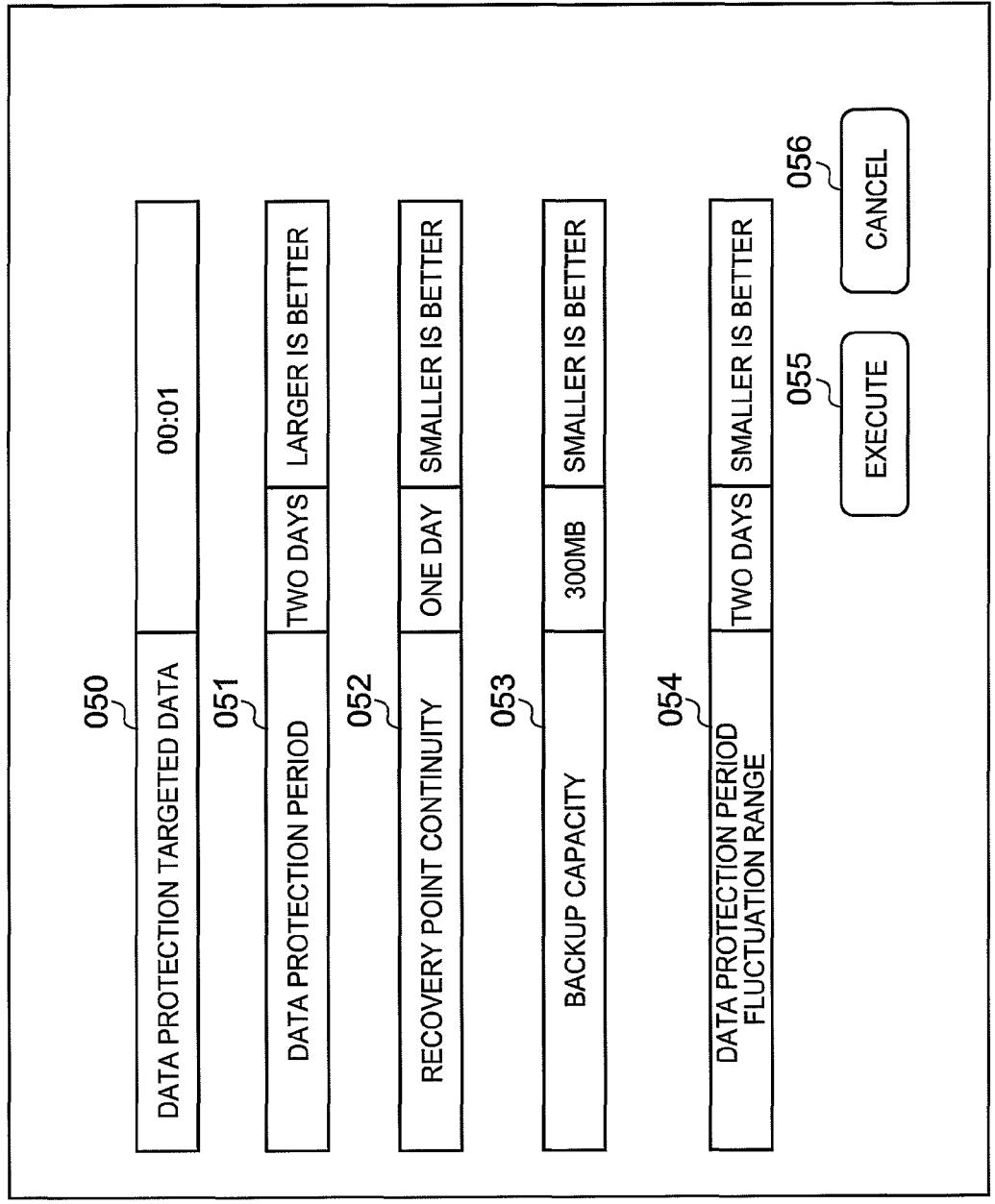
FIG. 7 shows an example of determination criteria input screen displayed by the management computer.

FIG. 7 is one example of a determination criteria input screen. The determination criteria input screen is for inputting values related to criteria for the user to determine the propriety of a backup configuration migration. According to FIG. 7, for example, there is a field 050 for inputting the identifier of a data storage extent storing protection-targeted data (source data), a field 051 for inputting the criteria value of a data protection period (for example, two days) and a determination criteria (for example, larger is better), a field 052 for inputting a criteria value for recovery point continuity (for example, one day) and a determination criteria (smaller is better), a field 053 for inputting a criteria value for backup capacity (for example, 300 MB) and a determination criteria (for example, smaller is better), and a field 054 for inputting a criteria value for the data protection period fluctuation range (for example, two days) and a determination criteria (for example, smaller is better). Further, the determination criteria input screen has an execution button 055, which the user presses to register an inputted criteria value and determination criteria, and a cancel button 056, which the user presses to cancel an inputted criteria value and determination criteria. When the execution button 055 is pressed, the migration determination program 324 registers the criteria value and determination criteria inputted for each determination item in the determination criteria management table 325. Furthermore, the determination criteria input screen of FIG. 7 is an example, and there is no need to limit the type of configuration and displayed information to this example (for example, a weighting coefficient can also be inputted for each determination item).

The migration determination program 324 references the determination criteria management table 325, acquires the value calculated by the data analysis program 323 for each determination item, and performs scoring for a determination item based on the acquired values, and the criteria values, determination criteria and weighting coefficients recorded in the determination criteria management table 325.

Figure 8:
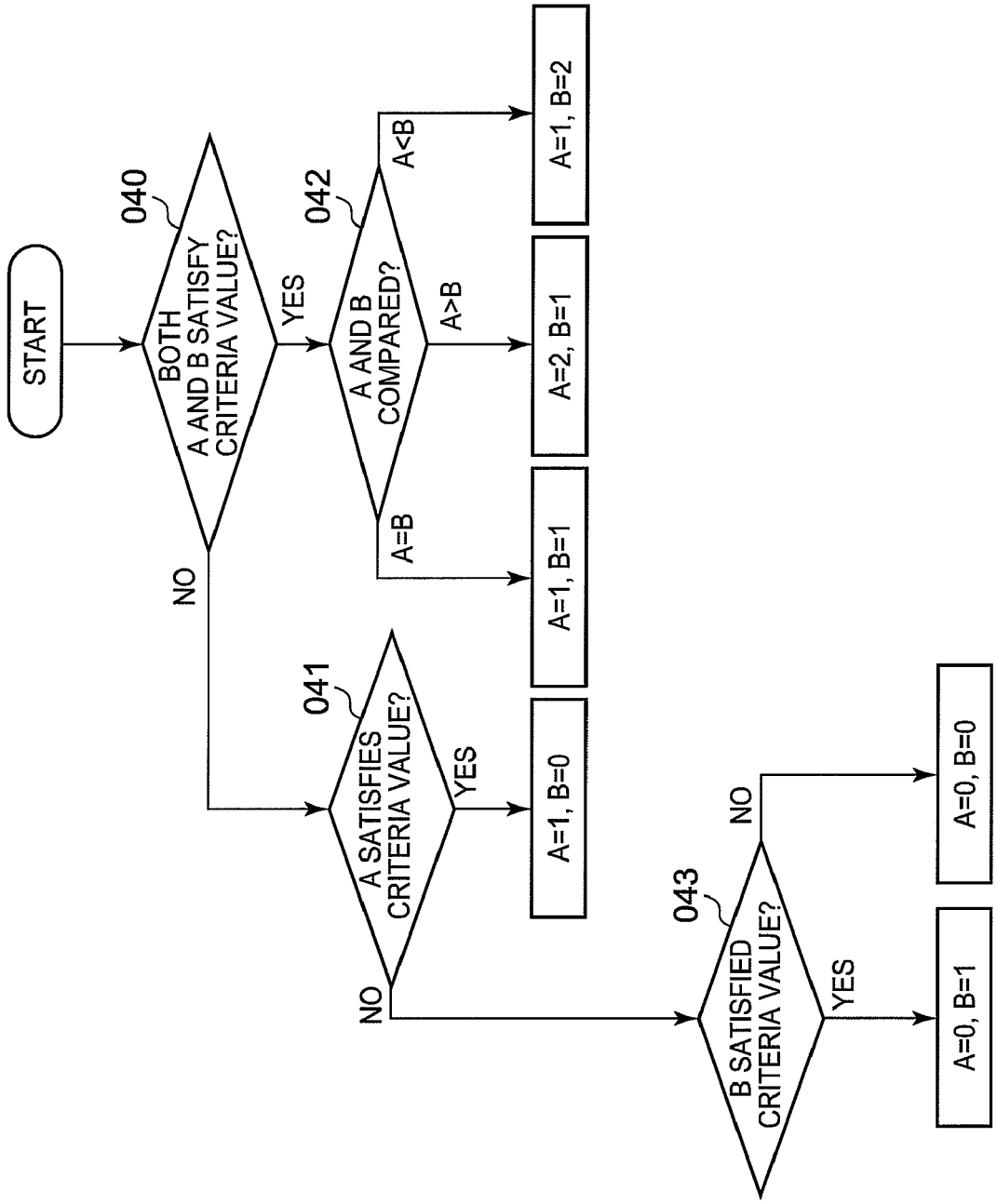
FIG. 8 shows an example of the flow of scoring for determination items.

An example of scoring will be explained below by referring to FIG. 8. FIG. 8 shows the flow of scoring for one determination item for which the determination criteria is greater than the criteria value (that is, a determination item for which a larger value is better).

Here, any of three integers, "0", "1" or "2" is assigned as a score for one determination item. It is assumed that "A" is the calculation result (for example, the data protection period) of the fixed-time backup configuration, and that "B" is the calculation result (for example, the data protection period) of the CDP backup configuration for the determination item.

In FIG. 8, when both A and B satisfy the respectively corresponding criteria value and determination criteria (Step 040: YES), the migration determination program 324 compares A and B to one another (Step 041). If the result is that the two values are equal, the migration determination program 324 assigns a score of "1" to each of A and B, if the result is A is larger than B, the migration determination program 324 assigns a score of "2" to A and a score of "1" to B (this kind of scoring is also done when A is smaller than B for a determination item for which the determination criteria is the criteria value or less), and if the result is that A is smaller than B, the migration determination program 324 assigns a score of "1" to A and a score of "2" to B. Conversely, if either one of A or B does not satisfy the criteria value (Step 040: NO), when A satisfies the criteria value and the determination criteria (Step 041: YES), the migration determination program 324 assigns a score of "1" to A, and a score of "0" to B. When A does not satisfy the criteria value (Step 041: NO), but B does satisfy the criteria value (Step 043: YES), the migration determination program 324 assigns a score of "0" to A, and assigns a score of "1" to B. When B does not satisfy the criteria value (Step 043: NO), the migration determination program 324 assigns a score of "0" to both A and B.

The sum of the values obtained by multiplying the weighting coefficient by the score calculated for each determination item is calculated for both the fixed-time backup configuration and the CDP backup configuration. That is, this sum is calculated using (Equation i) below. The X represents the respective determination items listed in the determination criteria management table 325.

[Final Score]=Σ([determination item $X$ score]×[determination item $X$ weighting coefficient])  (Equation i)

The final scores for each of the fixed-time backup configuration and the CDP backup configuration, score for each determination item, and backup performance calculated for each determination item (data protection period, recovery point continuity, backup capacity, and data protection period fluctuation range) calculated as described hereinabove are displayed side-by-side by backup configuration on the output device 330 of the management computer 300 by the migration determination program 324 (for example, see FIG. 12). Consequently, the user can easily determine whether or not it is appropriate to migrate from the existing fixed-time backup configuration to the CDP backup configuration. This will be explained in more detail below.

Look at FIG. 1 again. The monitoring information management table 326 records the management information comprised in the monitoring data acquisition request sent to the storage system 100 via the management information input/output program 321. FIG. 9 shows an example of the monitoring information management table 326. In the monitoring information management table 326, the identifiers of the data storage extents 120 targeted for monitoring are recorded in field 3260, the monitoring period for each data storage extent 120 is recorded in field 3261, and the data acquisition interval for each data storage extent 120 is recorded in field 3262. According to the example of FIG. 9, data storage extent 00:01 has a monitoring period of two days, and a data acquisition interval of 15 minutes. These parameters can be defined beforehand by the user.

The performance information management table 327 manages information related to the input-output performance of replicated data storage extents 121 inside the storage system 100, and is prepared for each data storage extent 120. FIG. 10 shows an example of the performance information management table 327. In the performance information management table 327, the identifiers of the replicated data storage extents are recorded in field 3270, and the input/output performance of each replicated data storage extent is recorded in field 3271. Furthermore, there is no need to restrict conditions, such as the write-data length on which the input/output performance is premised. The input/output performance recorded in this table 327 can be applied as the above-mentioned journal write performance or base data write performance. For example, when it is assumed that replicated data storage extent 0A:01 is the base data storage extent, base data write performance is 30 MB/s (MB per second), and when it is assumed that replicated data storage extent 0A:02 and 0A:03 are both journal data storage extents, journal write performance is either 30 MB/s or 40 MB/s (for example, when there are two kinds of journal write performance like this, the smaller performance value is adopted as the basis for $P_j$.).

Operating the above-describe computer system makes it possible for the user to easily determine if the fixed-time backup configuration or CDP backup configuration is appropriate for the relevant computer system. The flow of processing carried out in this embodiment will be explained using FIG. 11.

First, the management computer 300 receives in accordance with a user input operation a determination support request (a request to support a determination as to whether or not migrating the backup configuration is appropriate), which specifies a data storage extent identifier (Step 01). This triggers the data collection program 322 to make a monitoring data acquisition request comprising the specified data storage extent identifier and management information corresponding thereto (the monitoring period and data acquisition interval acquired from the monitoring information management table 326), and to issue this monitoring data acquisition request to the storage system 100 by way of the management information input/output program 321 (Step 02).

In the storage system 100, the management information input/output program 131 receives the monitoring data acquisition request, and transfer this request to the data input/output monitoring program 134. The data input/output monitoring program 134 acquires data input/output information (the write-amount for each data acquisition interval) and replicated data acquisition time for the specified data storage extent 120 in the monitoring period comprised in the monitoring data acquisition request (for example, the monitoring period that has the time at which this monitoring data acquisition request was received as the start time) (Step 03). The data input/output monitoring program 134 sends to the management computer 300 at a certain timing (for example, either regularly, or when the monitoring period ends) the data input/output information and configuration information comprising the replicated data acquisition time (for example, the information recorded in the replicated data management table 115 for the specified data storage extent 120 (the storage capacity of the data storage extent, and the identifiers and storage capacities of the respective replicated data storage extents)) (Step 04).

In the management computer 300, the management information input/output program 321 receives the data input/output information and replicated data acquisition time, and the data analysis program 323 uses this information to calculate the backup performance (the data protection period, recovery point continuity, backup capacity, and data protection period fluctuation range) for each determination item recorded in the determination criteria management table 325 for both the fixed-time backup configuration and the CDP backup configuration (Step 05). Then, the migration determination program 324 calculates the score for each determination item and calculates the final score for both the fixed-time backup configuration and the CDP backup configuration, and displays a screen (for example, the screen illustrated in FIG. 12) displaying the calculation results for both the fixed-time backup configuration and the CDP backup configuration side by side (Step 06).

The user can recompute these scores at this time by changing the criteria values and/or the determination criteria (for example, the backup capacity) for the CDP backup configuration (Step 10: YES). More specifically, for example, the current backup capacity for the CDP backup configuration is 300 MB, the same as the backup capacity of the fixed-time backup configuration, but the user can command the data analysis program 323 to input a smaller (or larger) backup capacity than this, and recompute the backup performance for the respective determination items for the CDP backup configuration. In this case, the data analysis program 323 assumes both the storage capacity of the base data storage extent and the storage capacity of the journal storage extent based on the inputted backup capacity and the storage capacity of the data storage extent, and computes the backup performance for the respective determination items (data protection period and so forth). By so doing, for example, if the backup performance satisfies the criteria value and determination criteria for a user-emphasized determination item from among the plurality of determination items for the CDP backup configuration, the user can learn whether or not satisfying the criteria value and determination criteria for this emphasized determination item is sustainable even if the backup capacity is reduced (or increased), thereby enabling the construction of a CDP backup configuration that is more in line with the user's needs. Furthermore, for example, the pre-change computation results for the criteria values and/or determination criteria (the backup performance and score for each determination item, and the final scores) can be displayed alongside the post-change computation results for the criteria values and/or determination criteria at this time. Consequently, the user can readily determine which criteria value and/or determination criteria are better for the CDP backup configuration.

When the user looks at the displayed screen, and decides to migrate from the fixed-time backup configuration to the CDP backup configuration (Step 07: YES), the user commands the management computer 300 to migrate the backup configuration. The migration determination program 324, in response to the command from the user, issues a migration indication (for example, a migration indication comprising the respective identifiers of the base data storage extent and the journal storage extent) to the storage system 100 (Step 08), and the storage system 100 receives this indication (Step 09). Thereafter, the migration from the fixed-time backup configuration to the CDP backup configuration can be carried out in the storage system 100 in accordance with this migration indication, and this migration does not have to follow a specific processing flow.

Furthermore, when the user decides not to migrate the backup configuration, and inputs this decision to the management computer 300 (Step 07: NO), this processing ends.

The above processing flow will be explained in more detail using a specific example.

When a determination support request is inputted using the input device 340 of the management computer 300, a monitoring data acquisition request is issued from the management computer 300 to the storage system 100. The monitoring data acquisition request, for example, comprises the identifier of monitoring-targeted data storage extent "00:01", a monitoring period of "two days" and a data acquisition interval of "15 minutes" (Refer to FIG. 9).

In the relevant monitoring period (two days), data input/output information and the replicated data acquisition time are sent to the management computer 300 either every data acquisition interval, or subsequent to the end of the relevant monitoring period. Further, the storage system 100 sends information related to the fixed-time backup configuration for the data storage extent 00:01, more specifically, information recorded in the replicated data management table 135 for the data storage extent 00:01 (that is, the information shown in FIG. 2) to the management computer 300.

First, the data analysis program 323 calculates the data protection period, recovery point continuity, backup capacity, and data protection period fluctuation range in the existing backup configuration (that is, the fixed-time backup configuration), and also estimates the data protection period, recovery point continuity, backup capacity, and data protection period fluctuation range for the CDP backup configuration. The calculation results constitute values such as those shown below.

<Fixed-Time Backup Configuration>
(1) Data Protection Period: Values of solid line graph shown in FIG. 3
(2) Recovery Point Continuity: One day
(3) Backup Capacity: 300 MB
(4) Data Protection Period Fluctuation Range: One day <CDP Backup Configuration>
(1) Data Protection Period: Values of graph shown in FIG. 5.
(2) Recovery Point Continuity: One second
(3) Backup (CDP) Capacity: 300 MB (Replicated Data 100 MB; Journal 200 MB)
(4) Data Protection Period Fluctuation Range: Two days Accordingly, when scoring is carried out based on the determination criteria management table of FIG. 6 using the flow of FIG. 8, scores such as those shown below are obtained for the respective determination items.
(1) Data Protection Period: Fixed-time Backup Configuration=1, CDP Configuration=2
(2) Recovery Point Continuity: Fixed-time Backup Configuration=1, CDP Configuration=2

(3) Backup Capacity: Fixed-time Backup Configuration=1, CDP Configuration=1
(4) Data Protection Period Fluctuation Range: Fixed-time Backup Configuration=1, CDP Configuration=0

When the final scores are calculated from the above-mentioned calculation results in accordance with (Equation i), the final score for the existing fixed-time backup configuration becomes (1×0.4)+(1×0.3)+(1×0.2)+(1×0.1)=1.0 and the final score for the CDP configuration becomes (2×0.4)+(2×0.3)+(1×0.2)+(0×0.1)=1.6

Figure 12:
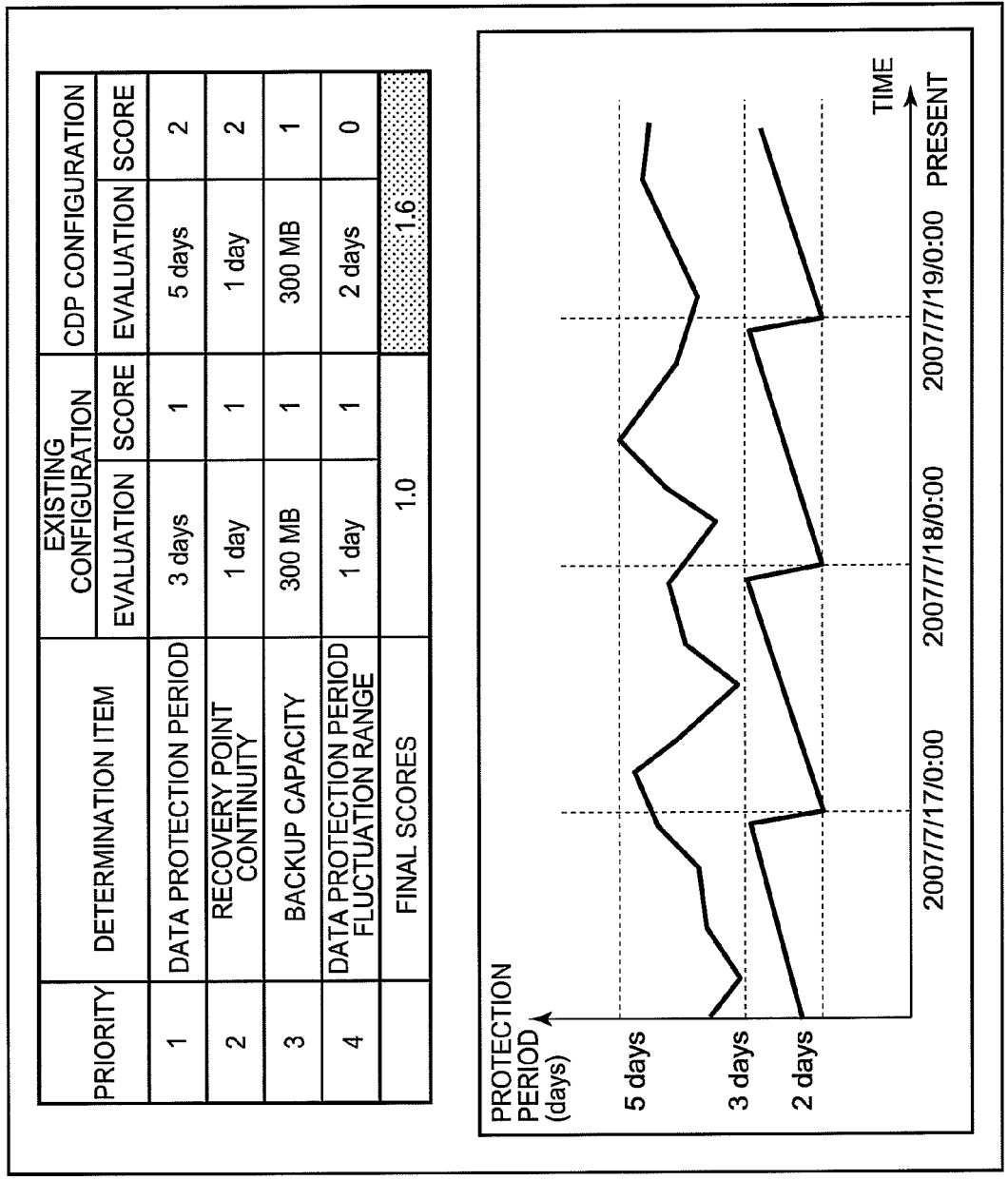
FIG. 12 shows an example of a determination support screen displayed by the management computer.

The final scores and score for each determination item calculated like this can be displayed in the determination support screen, which is displayed on the management computer 300 as illustrated in FIG. 12. The determination support screen is the screen on which backup performance calculation results and the results of scoring are displayed. According to FIG. 12, the determination items and their priorities (order of the weighting coefficients) are displayed in the determination support screen, for example, in a tabular format, and, in addition, the final scores for both the existing configuration (fixed-time backup configuration) and CDP backup configuration are displayed. Further, the backup performance (evaluations) and score for each determination item are also displayed for both the existing configuration (fixed-time backup configuration) and CDP backup configuration. Furthermore, the monitoring period (flow of time) is represented on the horizontal axis, and the data protection period is represented on the vertical axis, and a line graph (results plotted on a time line) denoting the transition of the data protection period for the fixed-time backup configuration, and a line graph denoting the transition of the data protection period for the CDP backup configuration are displayed in the determination support screen. The color of the highest score can be changed, and the superior results can be highlighted in this determination support screen. By viewing this determination support screen, for example, the user can determine whether to retain the existing configuration, or migrate to the CDP backup configuration simply by comparing the final scores. Either instead of or in addition to comparing the final scores, it is also possible to determine whether or not to migrate the backup configuration by comparing the graphs denoting the transitions of the data protection periods (for example, the degree of overlap), and comparing the scores corresponding to the determination items with the highest priority.

Furthermore, in this first embodiment, the migration determination program 324 can compare the scores for each of the determination items, and/or can compare the final scores, either in addition to or instead of displaying the determination support screen illustrated in FIG. 12, and can control whether or not migration is carried out in accordance with the results of these comparisons. For example, when the final score of the CDP backup configuration is higher than that of the fixed-time backup configuration, the migration determination program 324 can send a migration indication to the storage system 100 without querying the user.

Second Embodiment

A second embodiment of the present invention will be explained hereinbelow using FIG. 13. The differences with the first embodiment will mainly be explained at this time, and explanations of points in common with the first embodiment will be either simplified or omitted.

In the second embodiment, as was explained above, the CDP backup configuration has already been constructed in the storage system 100 as the existing backup configuration, and a determination is made as to whether it is appropriate to migrate from the CDP backup configuration to the fixed-time backup configuration.

Figure 13:
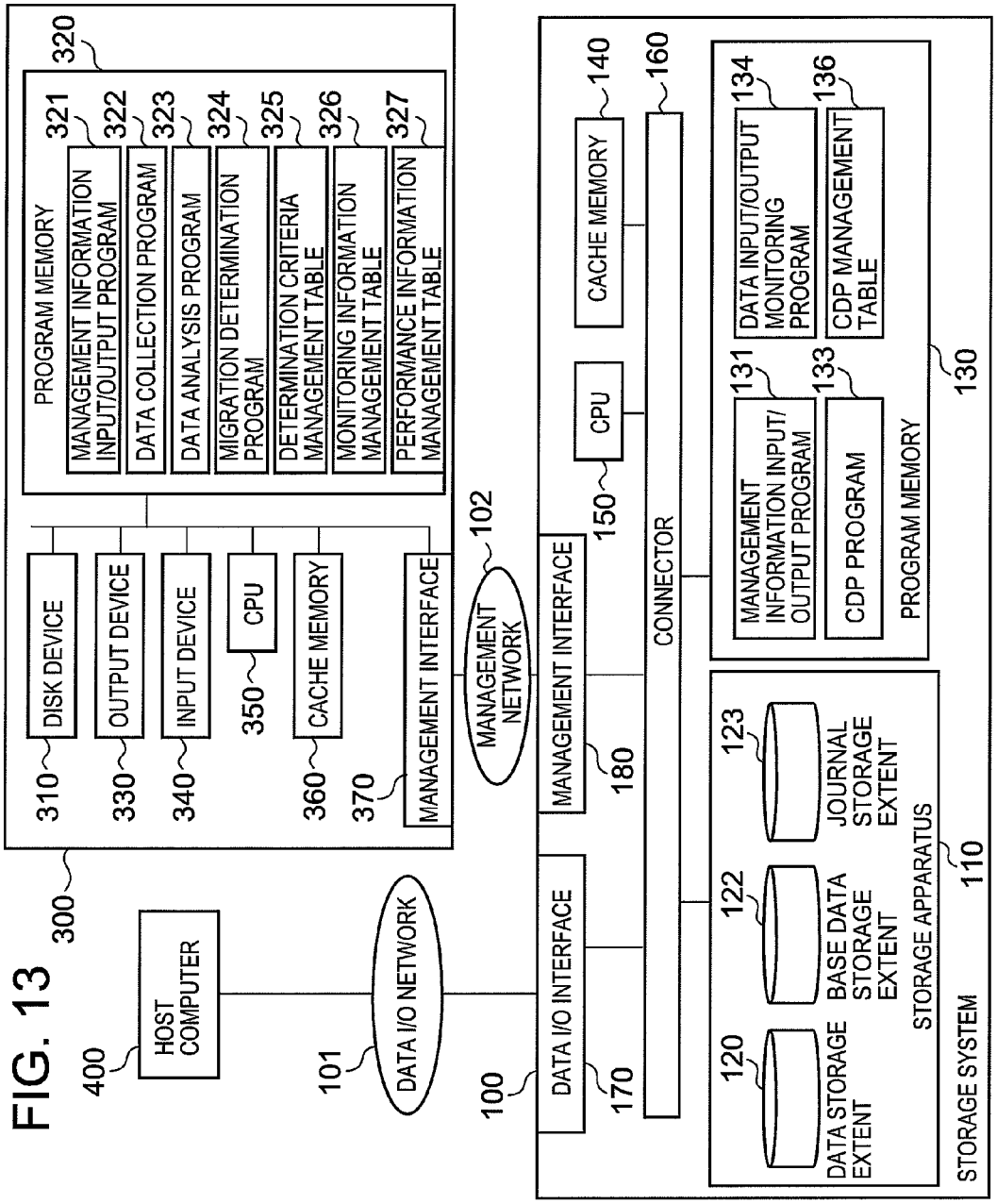
FIG. 13 shows an example of the constitution of a computer system in a second embodiment of the present invention.

FIG. 13 is a diagram showing an example of the constitution of a computer system in the second embodiment of the present invention.

This computer system can be the same as the constitution in the first embodiment with the exception of the points described below. That is, the storage apparatus 110 has a base data storage extent 122 and a journal storage extent 123. Program memory 130 stores a CDP program 133 or a CDP management table 136. The CDP program 133 realizes data protection in the storage system 100 using CDP technology. For example, the CDP program 133 acquires replicated data (that is, base data) for a data storage extent 120 at the point in time immediately prior to a CDP protection-targeted period defined by the CDP management table 136, and stores this base data in the base data storage extent 122. Further, when write-data is written to the data storage extent 120 on or after the relevant base data acquisition time, the CDP program 133 acquires a journal comprising this write-data, and stores this journal (or the journal data only) in the journal storage extent 123. Further, upon receiving a recovery request from either the host computer 400 or the management computer 300, the CDP program 133 recovers data at a specified time by reflecting, from among the unreflected journals, in order in the base data journals from the journal having the oldest time until the journal at the specified time described in this recovery request. Further, when the amount of stored journals in the journal storage extent 123 reaches the journal capacity threshold retained in the CDP management table 136, the CDP program 133 reflects, from among the journals stored in the journal storage extent 123, in order in the base data journals from the oldest journal (journal for which the time denoted by the journal meta data is the oldest) to the journal just under the journal capacity threshold. The CDP program 133 updates the CDP management table 136 at this time as needed.

The CDP management table 136 retains CDP-related information referenced by the CDP program 133. FIG. 14 shows an example of the CDP management table 136. In the CDP management table 136, the identifiers of the data storage extents 120 targeted for protection by the CDP technology are recorded in field 1360, the storage capacities of these data storage extents 120 are recorded in field 1361, the identifiers of the base data storage extents 122 corresponding to these data storage extents 120 are recorded in field 1362, the storage capacities of these base data storage extents 122 are recorded in field 1363, the acquisition times of the base data are recorded in field 1364, the identifiers of the journal storage extents 123 corresponding to these base data storage extents 122 are recorded in field 1365, the storage capacities of these journal storage extents 123 are recorded in field 1366, and the journal capacity thresholds (the above-mentioned threshold H) corresponding to these journal storage extents 123 are recorded in field 1367.

In FIG. 13, the data replication program 132 is not shown in the program memory 130 of the storage system 100, and this program 132 does not necessarily have to the stored. When not stored, this program 132 can be installed when migrating to the fixed-time backup configuration. This is the same as the CDP program 133 not being shown in FIG. 1.

In this second embodiment, since the existing backup configuration is the CDP backup configuration, the data analysis program 323 can calculate the backup performance for the respective determination items for the CDP backup configuration based on information received from the storage system 100 (for example, information recorded in the CDP management table 136). The backup performance for the respective determination items can be estimated for the fixed-time backup configuration, for example, based on a replicated data acquisition interval inputted by the user, and the storage capacity of the data storage extent in the CDP backup configuration. In this case, for example, according to the CDP management table 136 shown in FIG. 14, since the storage capacity of both the base data storage extent 122 and the journal storage extent 123 is 100 MB for the data storage extent 00:01, the data analysis program 323 can make the backup capacity 200 MB, which is the total of these storage capacities, and can assume that the base data storage extent 122 and the journal storage extent 123 are both replicated data storage extents.

A number of embodiments of the present invention have been explained hereinabove, but these embodiments are examples for explaining the present invention, and do not purport to limit the scope of the present invention solely to these embodiments. The present invention can also be put into practice in a variety of other modes.

What is claimed is:

1. A computer which is connected to a storage system, the storage system comprises a plurality of data storage extents, writes write-data conforming to a write request to a first data storage extent specified in the write request, and retains backup data of the first data storage extent in one or more second data storage extents using a first backup method, the computer comprising:
   an acquisition module for acquiring a backup status in use of the first backup method at a prescribed period;
   a computation module for computing a first backup performance using a first backup configuration, which is defined by a first corresponding relationship between the first data storage extent and the one or more second data storage extents, and the first backup method, based on the acquired backup status;
   an estimation module for estimating a second backup performance using a second backup configuration, which is defined by a second corresponding relationship between the first data storage extent and one or more second data storage extents, and a second backup method, based on a prescribed assumption in the prescribed period;
   an output module for outputting information based on the computed first backup performance and the estimated second backup performance; and
   a reception module for receiving a write-amount, which is the amount of write-data at each point-in-time interval for the first data storage extent in the storage system, wherein
   the acquisition module acquires respective write times at which data has been written to the second data storage extent in use of the first backup method at the prescribed period;
   the computation module computes a first data protection period, which is a time period from the oldest time at which backup data is recoverable using the first backup method until a targeted time, for the respective targeted times in the prescribed period, based on the respective acquired write times;
   the estimation module estimates a second data protection period, which is a time period from the oldest time at which backup data is recoverable using the second backup method until a targeted time, for the respective targeted times in the prescribed period, based on the write-amount at each of the received point-in-time interval;
   the second backup configuration is a Continuous Data Protection (CDP) backup configuration;
   the second data storage extents in the second backup configuration include a base data storage extent, in which base data that is a replication of data stored in the first data storage extent is stored, and a journal storage extent, in which a journal that is information related to a write history in the first data storage extent and that is reflected in the base data, is stored;
   the estimation module estimates an amount of stored journals, which is an amount of journals stored in the journal storage extent, for the respective targeted times at the prescribed period based on the write-amount at each received point-in-time interval, and estimates the second data protection period for the respective targeted time based on the write-amount at each the received point-in-time interval and the amount of stored journals at the respective targeted times; and
   an estimation equation for the amount of stored journals $C_T$ at the respective targeted times is:

$$C_T = C_{T-1} + (I_T - O_T)$$

where, $C_{T-1}$ is an amount of stored journals at an immediately prior targeted time; $I_T$ is an input amount, which is an amount of journals inputted to the journal storage extent at a targeted point-in-time interval from the immediately prior targeted time until the current targeted time; and $O_T$ is an output amount, which is an amount of journals deleted from the journal storage extent at the targeted point-in-time interval.

2. The computer according to claim 1, wherein
   the reception module further receives a storage capacity of the one or more second data storage extents in the first backup configuration; and
   the prescribed assumption is that the one or more second data storage extents in the second backup configuration have the same storage capacity as the storage capacity of the one or more second storage extents in the first backup configuration.

3. The computer according to claim 2, further comprising an assumption receiving module for receiving from a user an assumption input that differs from the prescribed assumption, wherein
   the estimation module estimates the second backup performance based on the different assumption inputted from the user.

4. The computer according to claim 2, wherein $I_T$ is the smallest value from among $W_T + W'_{T-1}$, $P_j$, and $V - C_{T-1}$.

5. The computer according to any one of claims 1 through 3, wherein
   the first backup performance, in addition to a first data protection period, has at least one of a storage capacity of one or more second data storage extents in the first backup configuration, continuity of backup times for recoverable backup data, and a fluctuation range of the first data protection period; and
   the second backup performance, in addition to a second data protection period, has at least one of a storage capacity of one or more second data storage extents in the second backup configuration, continuity of backup times for recoverable backup data, and a fluctuation range of the second data protection period.

6. The computer according to claim 5, further comprising:
a scoring module for carrying out scoring, wherein the scoring module computes a score for a determination item of the first data protection period, and at least one determination item from among respective determination items, in the first backup configuration, of the storage capacity of one or more second data storage extents, the continuity of backup times for recoverable backup data, and the fluctuation range of the first data protection period, based on the result of comparing a first backup performance corresponding to the determination item with a reference value, and/or the result of comparing the first backup performance corresponding to the determination item with a second backup performance; and computes a score for a determination item of the second data protection period, and at least one determination item from among respective determination items, in the second backup configuration, of the storage capacity of one or more second data storage extents, the continuity of backup times for recoverable backup data, and the fluctuation range of the second data protection period, based on the result of comparing the second backup performance corresponding to the determination item with a reference value, and/or the result of comparing the first backup performance corresponding to the determination item with the second backup performance.

7. The computer according to claim 6, wherein the scoring module calculates a total score, which is calculated on the basis of the respective scores, and/or not less than two scores of each backup configuration, based on a weighting coefficient for each determination item.

8. The computer according to claim 7, wherein the output module displays the computed first backup performance alongside the estimated second backup performance.

9. The computer according to claim 8, further comprising: a determination module for comparing the computed first backup performance with the estimated second backup performance, and determining that the superior of these performance is the appropriate backup configuration, wherein the output module outputs information based on the determination result as information based on the computed first backup performance and the estimated second backup performance.

10. The computer according to claim 9, wherein information based on the determination result is an instruction for changing from the first backup configuration to the second backup configuration, and is information which is sent to the storage system.

11. The computer according to claim 1,
wherein $W_T + W'_{T-1}$, $P_j$, or $V - C_{T-1}$, $W_T$ is a write-amount at a targeted point-in-time interval, $W'_{T-1}$ is an amount of unwritten journal in the journal storage extent at the immediately prior targeted point-in-time interval, $P_j$ is journal write performance at the targeted point-in-time interval calculated by multiplying the amount of journals capable of being written to the journal storage extent per module of time by the targeted point-in-time interval, and V is a storage capacity of the journal storage extent, and a computation equation for the amount of unwritten journals at the targeted point-in-time interval $W'_T$ is:

$$W'_T = (W_T + W'_{T-1}) - I_T.$$

12. The computer according to claim 1,
wherein $O_T$ is either $C_{T-1} + I_T - H$, or $P_D$, H is a threshold for determining if a journal is to be reflected in base data of a base data storage extent based on the amount of journals stored inside the journal storage extent, and $P_D$ is journal deletion performance.

13. The computer according to claim 12,
wherein $P_D$ is $P_J - I_T$ when $P_J < P_B$, and is the largest value of $P_J - I_T$ and $P_B$ when $P_J > P_B$, and $P_B$ is journal reflection performance at the targeted point-in-time interval calculated by multiplying the amount of journals capable of being reflected in the base data storage extent per module of time by the targeted point-in-time interval.

14. The computer according to claim 12 or 13,
wherein $O_T$ is the smallest value of the largest value of O and $C_{T-1} + I_T - H$, and $P_D$.

* * * * *